United States Patent [19]

Bard

[11] 3,734,527
[45] May 22, 1973

[54] BUCKET CHASSIS
[75] Inventor: Douglas C. Bard, Muskegon, Mich.
[73] Assignee: Beatrice Foods Co., Chicago, Ill.
[22] Filed: Feb. 4, 1971
[21] Appl. No.: 112,618

[52] U.S. Cl. .................................. 280/79.1
[51] Int. Cl. .................................. B62b 5/00
[58] Field of Search .................... 280/79.1, 79.2; 161/116, 123; 52/309, 593, 722

[56] References Cited

UNITED STATES PATENTS

| | | | |
|---|---|---|---|
| 2,665,922 | 1/1954 | Bard | 280/79.2 |
| 2,573,085 | 10/1951 | Yonkers | 280/79.1 |

*Primary Examiner*—Kenneth H. Betts
*Assistant Examiner*—Robert R. Song
*Attorney*—Harness, Dickey & Pierce

[57] ABSTRACT

A chassis for movably supporting a generally cylindrically-shaped container, pail, bucket or the like, the chassis being of a one-piece molded plastic construction and comprising a plurality of integrally connected generally coplanar arranged outwardly projecting arm sections adapted to support the container thereon, and means on the outer end of each of the arm sections adapted for operative connection to a rollable castor, wheel or the like, whereby the container may be rolled or otherwise traversed along the floor during use thereof.

1 Claim, 5 Drawing Figures

PATENTED MAY 22 1973
3,734,527
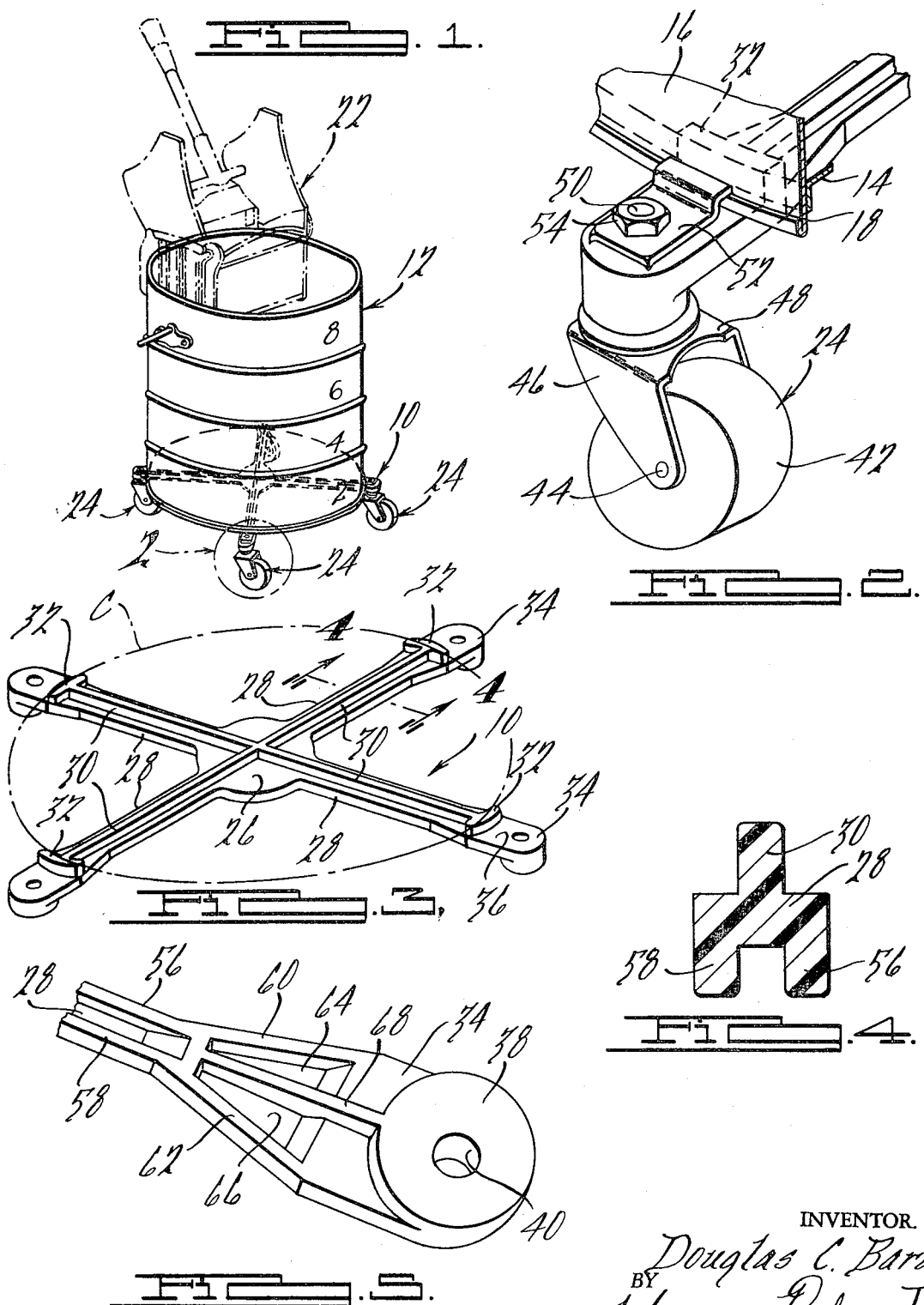
INVENTOR.
Douglas C. Bard.
BY Harness, Dickey & Pierce
ATTORNEYS 3,734,527

BUCKET CHASSIS

SUMMARY OF THE INVENTION

The present invention is generally directed toward a chassis for movably supporting pails, buckets and the like for rolling movement along a floor or other suitable generally horizontally disposed support surface. The bucket chassis of the present invention is of a one-piece molded plastic construction which generally comprises four outwardly projecting arm sections, each of which is provided with a castor, wheel or the like adapted to support the chassis for the aforesaid rolling movement. The chassis is designed so as to be extremely strong, yet lightweight, and this is accomplished by so designing the cross-sectional shape of the arm sections thereof so that maximum use is made of integral reinforcing ribs, fillets and the like. Together with the aforesaid advantages of being strong and lightweight, the bucket chassis of the present invention exhibits a number of additional features over similar type chassis devices known in prior art. For example, the bucket chassis of the present invention, by virtue of being fabricated of a plastic or other resinous molded material, is highly resistant to attack from strong cleaning fluids and/or chemicals with which the chassis is frequently used. Additionally, the chassis design of the present invention will be found to afford considerable material cost savings, as compared with similar devices heretofore known and used, with the result that the present invention is economical to mass produce, will find universality of application, and will have a long and effective operational life.

It is accordingly a general object of the present invention to provide a new and improved bucket chassis.

It is a more particular object of the present invention to provide a new and improved bucket chassis which is fabricated of a molded polymeric plastic or other natural or synthetic resinous material.

It is a further object of the present invention to provide a bucket chassis of the above described type which affords a substantial reduction in the cost of materials without any sacrifice in the structural integrity thereof.

It is still another object of the present invention to provide a bucket chassis of the above described type which is of a relatively simple design and is easy to assemble.

It is yet another object of the present invention to provide a bucket chassis of the above character which exhibits improved noise producing characteristics from being transported over irregular surfaces.

Other objects and advantages of the present invention will become apparent from the following detailed description taken in conjunction with the accompanying drawing.

BRIEF DESCRIPTION OF THE DRAWING

FIG. 1 is an elevated perspective view of a bucket chassis in accordance with an exemplary embodiment of the present invention, as shown in operative association with a conventional pail, bucket or the like;

FIG. 2 is an enlarged fragmentary perspective view of the portion of the chassis illustrated within the circle 2 of FIG. 1;

FIG. 3 is an enlarged elevated perspective view of the chassis illustrated in FIG. 1;

FIG. 4 is a transverse cross-sectional view taken substantially along the line 4—4 of FIG. 3; and FIG. 5 is an enlarged fragmentary perspective view of the underside of one of the arm sections of the chassis of the present invention.

DETAILED DESCRIPTION OF THE PREFERRED EMBODIMENT

Referring now in detail to the drawing and in particular to FIGS. 1 and 2, a bucket chassis, generally designated by the numeral 10, is shown in operative association with a conventional bucket, pail, tub, etc. or other container, generally designated by the numeral 12. The bucket 12 generally comprises a horizontally disposed bottom wall 14 and a generally cylindrically disposed side wall 16 which is connected to the bottom 14 and is formed with a downwardly projecting reversely bent supporting flange 18 adjacent the lower end thereof. By way of example, the bucket 12 is shown as being of the graduated type adapted to operatively support a conventional wringer assembly 22 for use in extricating liquid from mops and other types of cleaning equipment, as is well known in the art. As will hereinafter be described in detail, the chassis 10 is provided with a plurality (4) of castor assemblies 24 and is thereby adapted to support the bucket 12 and associated wringer assembly 22 for rolling movement along the floor or other suitable generally horizontally disposed surface.

Referring now to FIG. 3, the chassis 10 is of a one-piece molded construction and comprises a central, generally circular shaped body section 26 and a plurality (preferably 4) of outwardly projecting arm sections 28 which are arranged in coplanar relation and extend outwardly from the central body section 26 at generally right angles to one another. The chassis 10 is preferably fabricated of a molded natural or synthetic high strength resinous or elastomeric material, such as polyvinylchloride (PVC), polystyrene, molded plastic, fiberglass, hard rubber or other suitable material which lends itself to conventional molding techniques. The arm sections 28, as best seen in FIGS. 3 and 4, are formed with centrally disposed upwardly projecting rib portions 30 which intersect at the inner ends thereof at the center of the body section 26 and project radially outwardly along the upper sides of the arm sections 28. The radially outermost ends of the rib portion 30 associated with each of the arm sections 28 terminates at a generally circumferentially extending locating shoulder portion 32 which, like the rib portions 30, is formed integrally of the associated of the arm sections 28 and projects upwardly therefrom. The locating shoulder portions 32 are of a generally arcuate configuration and lie along the circumference of an imaginary circle, herein designated by the letter C, which is slightly smaller in diameter than the inside diameter of the supporting flange 18 of the bucket 12, with the result that the bucket 12 is adapted to rest or be supported upon the upper side of the chassis 10 and be centrally located thereon by having the supporting flange portion 18 extend around the outer periphery of the locating shoulder portions 32, as best seen in FIG. 2.

As illustrated in FIG. 3, the outer end of each of the arm sections 28 is formed with an enlarged section 34 which defines a generally horizontally disposed upper surface 36 upon which the flange section 18 of the associated bucket 12 is operatively supported. The underside or bottom of each of the sections 34 is formed with a generally annular or cylindrically shaped downwardly projecting support portion 38 which is formed with a central aperture or bore 40 that extends upwardly through the outer ends of the arm sections 28, as illustrated.

Each of the castor assemblies 24 comprises a conventional caster wheel or roller 42 rotatably mounted upon a support axis or shaft 44 within an associated mounting clevis 46. The clevis 46 of each of the assemblies 24 comprises a generally horizontally disposed upper surface 48 adapted for contiguous engagement with the underside or surface of one of the support portions 38. Each of the clevises 46 is mounted on the lower end of a generally vertically upwardly extending stub shaft 50 which is adapted to project upwardly through the aperture 40 of the associated arm section 28. Suitable means in the form of a retaining clip or the like 52 is preferably provided on the upper end of each of the stub shafts 50 and adapted for engagement with the return bend portion of the supporting flange 18 for securing the associated bucket 12 upon the chassis carriage 10 of the present invention. The upper ends of the stub shafts 50 are preferably externally threaded and are thereby adapted to receive nuts 54 for securing the castor assemblies 24 and retaining clips 52 upon the outer ends of the arm sections 28. A more detailed description of the construction and operation of the castor assemblies 24 and retaining clips 52 is described in U.S. Pat. No. 2,665,922, issued January 12, 1954 and assigned to the assignee of the present invention, which patent is incorporated by reference herein.

Together with the upwardly projecting rib portions 30, each of the arm sections 28 is formed with a pair of downwardly and outwardly extending spaced parallel rib portions 56 and 58 which cooperate with the associated of the rib portions 30 in rigidifying and strengthening the arm sections 28, yet minimizing to the extreme the cross-sectional size thereof. The outer ends of the rib portions 56, 58 diverge at the enlarged sections 34 located at the outer ends of the arm sections 28, as seen at 60 and 62 in FIG. 5. The area interjacent the diverging rib portions 60, 62 is recessed upwardly from the underside of the sections 34, as seen at 64 and 66 in FIG. 5, with the area 64, 66 being divided or separated by downwardly and outwardly inclined reinforcing fillet portions 68 which extend outwardly from the outer ends of the ribs 56, 58 to positions adjacent and coplanar with the lower sides of the downwardly projecting support portions 38.

The rib portions 30, 56 and 58, together with the diverging portions 60, 62, recessed areas 64 and 66, and reinforcing fillets 68 are, of course, all formed integrally of the outer ends of the arm sections 28 during the molding or casting thereof and said portions are designed so as to add maximum strength, yet minimize the amount of material required in the fabrication of the chassis 10. It will be appreciated, of course, that various alternative designs may be incorporated in strengthening or rigidifying the arm sections 28 without departing from the scope of the present invention.

It will be seen from the foregoing that the present invention provides a novel bucket chassis which may be fabricated in a substantially more economical manner than similar type devices heretofore known and used, whereby a considerable cost savings may be achieved in connection with the mass production thereof. Of equal importance, the chassis 10 of the present invention will be found to have a substantially greater strength-to-weight ratio, as compared with prior known devices, by virtue of the provision of the reinforcing ribs and fillets hereinabove described. Thus, the present invention provides a novel bucket chassis which cannot only be manufactured at a considerable savings in cost of material, but will also be found to be far more durable and have a substantially longer operational life than prior known chassis designs. Another feature of the present invention will be appreciated from the fact that the chassis 10 has been found to appreciably reduce the noise attendant the transporting of an empty bucket or container over a relatively rough or irregular surface, the molded resinous material functioning to dampen or absorb the objectionable audible vibrations produced during such transporting of an empty container so as to provide for more pleasant use of the chassis 10. A further feature of the present invention resides in the fact that the molded resinous material from which the chassis 10 is fabricated will be highly resistant to corrosion or other chemical attrition which prior known devices have been subjected to when used in connection with strong chemicals, cleaning fluids and the like, with the result that the chassis 10 of the present invention can be produced so as to have the pleasant aesthetic appearance when new, and will continue to maintain this appearance over its entire useful life.

While it will be apparent that the preferred embodiment illustrated herein is well calculated to fulfill the objects above stated, it will be appreciated that the present invention is susceptible to modification, variation and change without departing from the scope of the invention.

What is claimed is:

1. A chassis assembly for movably supporting a generally cylindrically shaped container, pail, bucket, or the like, said assembly comprising:

a generally horizontal one-piece chassis member fabricated of a corrosion-resistant molded polymeric material, said member comprising a central body section, a plurality of four arm sections integrally formed with and projecting horizontally and radially outwardly from said central body section at generally right angles to one another, each of said arm sections comprising a pair of circumferentially spaced, vertically projecting reinforcing ribs extending lengthwise along one side thereof and a third vertically projecting reinforcing rib extending lengthwise along the other side thereof, a support section integrally formed with and located at the radially outer end of each arm section, each of said support sections being circumferentially enlarged relative to the corresponding arm section and having a generally horizontally disposed upper surface adapted to support a container, each of said support sections comprising an integrally formed, circumferentially extending locating shoulder on the upper surface thereof, said locating shoulders being located on the radially innermost portions of the associated of said surfaces and defining a common imaginary circle whose center is located at the point of intersection of said arm sections, each of said shoulders extending generally circumferentially at least as far as the circumferential extremities of the associated of said support sections, with said locating shoulders being adapted for centrally locating a container on said chassis, each of said support sections comprising a vertically enlarged portion on the radially outer end thereof including means forming a vertical aperture extending through each of said vertically enlarged portions, reinforcing fillet means on each of said support sections for reinforcing the portion thereof radially inwardly of the vertically enlarged portion thereof, a plurality of four caster assemblies, each caster assembly underlying a support section and having a stud projecting upwardly through the corresponding aperture; and a plurality of four clips, each clip being mounted on the upper end of one of the caster assembly studs and being cooperable with the corresponding locating shoulder for removably securing a container on said chassis member.

* * * * *